United States Patent
Karstens

(10) Patent No.: US 7,789,315 B2
(45) Date of Patent: Sep. 7, 2010

(54) SECURING RFID ENCODED CONTENT CONTAINED IN RFID TAGS THAT ARE EMBEDDED IN OPTICAL MEDIA BASED UPON A SPIN RATE OF THE OPTICAL MEDIA

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 11/846,181

(22) Filed: Aug. 28, 2007

(65) Prior Publication Data

US 2009/0059738 A1 Mar. 5, 2009

Related U.S. Application Data

(63) Continuation-in-part of application No. 11/846,107, filed on Aug. 28, 2007.

(51) Int. Cl.
*G06K 19/06* (2006.01)
(52) U.S. Cl. ...................... 235/492; 235/487
(58) Field of Classification Search ............... 235/487, 235/492
See application file for complete search history.

(56) References Cited

U.S. PATENT DOCUMENTS

| | | | | |
|---|---|---|---|---|
| 5,905,798 A * | 5/1999 | Nerlikar et al. | ............... | 705/57 |
| 6,005,940 A * | 12/1999 | Kulinets | ...................... | 705/51 |
| 6,356,517 B1 * | 3/2002 | Liu et al. | ....................... | 369/14 |
| 6,542,444 B1 * | 4/2003 | Rutsche | ........................ | 369/14 |
| 6,902,111 B2 * | 6/2005 | Han et al. | .................... | 235/454 |
| 7,038,985 B2 * | 5/2006 | Ryal | ........................ | 369/53.21 |
| 7,292,147 B2 * | 11/2007 | Benedikt | ................. | 340/572.7 |
| 7,292,512 B2 * | 11/2007 | Ryal | ........................ | 369/53.21 |
| 7,317,396 B2 * | 1/2008 | Ujino | ........................ | 340/572.1 |
| 7,385,284 B2 * | 6/2008 | Carrender | ................... | 257/692 |
| 7,497,385 B2 * | 3/2009 | Forster et al. | ............... | 235/492 |
| 2005/0180566 A1 * | 8/2005 | Ryal | ........................... | 380/57 |
| 2005/0270964 A1 * | 12/2005 | Ujino | ......................... | 369/274 |
| 2006/0015752 A1 * | 1/2006 | Krueger | ..................... | 713/193 |
| 2006/0071795 A1 * | 4/2006 | Benedikt | ................. | 340/572.7 |
| 2006/0077062 A1 * | 4/2006 | Andrechak et al. | ....... | 340/572.8 |
| 2006/0109123 A1 * | 5/2006 | Carrender | ............... | 340/572.1 |
| 2006/0109130 A1 * | 5/2006 | Hattick et al. | ............ | 340/572.7 |
| 2006/0174353 A1 * | 8/2006 | Ryal | ........................... | 726/31 |
| 2006/0290509 A1 * | 12/2006 | Forster et al. | ............ | 340/572.3 |
| 2007/0001852 A1 | 1/2007 | Jalkanen et al. | | |
| 2008/0273451 A1 * | 11/2008 | Shuster | ....................... | 369/284 |

\* cited by examiner

*Primary Examiner*—Daniel A Hess
*Assistant Examiner*—Paultep Savusdiphol
(74) *Attorney, Agent, or Firm*—Patents On Demand, P.A.; Brian K. Buchheit

(57) ABSTRACT

The present invention discloses a solution for protecting RFID encoded content based upon a spin rate of a media within which an RFID tag containing the content is embedded. The solution can include a step of securing tag encoded content stored on an RFID tag embedded in an optical media. A spin rate the optical media can be determined. The tag encoded content can be selectively unprotected when the detected spin rate is approximately equal to a previously established rate or is between a previously established range of values. The spin rate can be based upon a rotational velocity of the optical media and/or a rotational acceleration of the optical media.

16 Claims, 2 Drawing Sheets

SECURING RFID ENCODED CONTENT CONTAINED IN RFID TAGS THAT ARE EMBEDDED IN OPTICAL MEDIA BASED UPON A SPIN RATE OF THE OPTICAL MEDIA

CROSS-REFERENCE TO RELATED APPLICATIONS

This continuation-in-part application claims the benefit of U.S. patent application Ser. No. 11/846,107 filed Aug. 28, 2007, which is incorporated by reference herein.

BACKGROUND

1. Field of the Invention

The present invention relates to media content protection, and more particularly, to securing RFID encoded content contained in RFID tags that are embedded in optical media based upon a spin rate of the optical media.

2. Description of the Related Art

U.S. patent application Ser. No. 11/846,107, entitled "PROTECTION OF OPTICALLY ENCODED CONTENT USING ONE OR MORE RFID TAGS EMBEDDED WITHIN ONE OR MORE OPTICAL MEDIAS" and filed Aug. 28, 2007, discloses a novel solution of embedding RFID tags into optical media. In that solution, content encoded in the embedded RFID tag is used to secure optically encoded content. Any potential mechanism designed to circumvent the protections of U.S. patent application Ser. No. 11/846,107 would require security information encoded to be read from the RFID tag. The present invention discloses a use of a media spin rate for selectively protecting RFID tag encoded content, which in one embodiment, could provide enhanced security for the solution disclosed in U.S. patent application Ser. No. 11/846,107. No known conventional technology embeds RFID tags in optical media or selectively secures tag encoded content based upon a spin rate of the optical media.

SUMMARY OF THE INVENTION

The present invention can be implemented in accordance with numerous aspects consistent with the material presented herein. For example, one aspect of the present invention can include a method for protecting RFID encoded content. The method can include a step of securing tag encoded content stored on an RFID tag embedded in an optical media. A spin rate the optical media can be determined. The tag encoded content can be selectively unprotected when the detected spin rate is approximately equal to a previously established rate or is between a previously established range of values. The spin rate can be based upon a rotational velocity of the optical media and/or a rotational acceleration of the optical media.

Another aspect of the present invention can include an optical media comprising an RFID tag that includes protected RFID encoded content stored in the RFID tag. Protection for the protected RFID encoded content can be based upon a spin rate of the optical media. The optical media can optionally include an accelerometer and/or a physical gate. The accelerometer can be embedded in the optical media and can be used to detect the acceleration rate (e.g., one type of spin rate) of the optical media. The detected acceleration rate can be used to determine whether one or more sections of the RFID encoded content on one or more RFID tags is protected or is unprotected. The physical gate can be used to disable access to the RFID encoded content when the spin rate of the optical media does not equal a previously established value or is outside a previously established range of values. When the spin rate is within the range of values or is approximately equal to a desired rate, the physical gate can be switched to enable access to the RFID encoded content.

Still another aspect of the present invention can include an optical media drive that includes an optical reader and a RFID reader. The optical reader can read optically encoded content stored in optical media. The RFID reader can read tag encoded content stored in at least one RFID tag embedded in optical media. At least a portion of the tag encoded content can be protected based upon a spin rate of the optical media.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
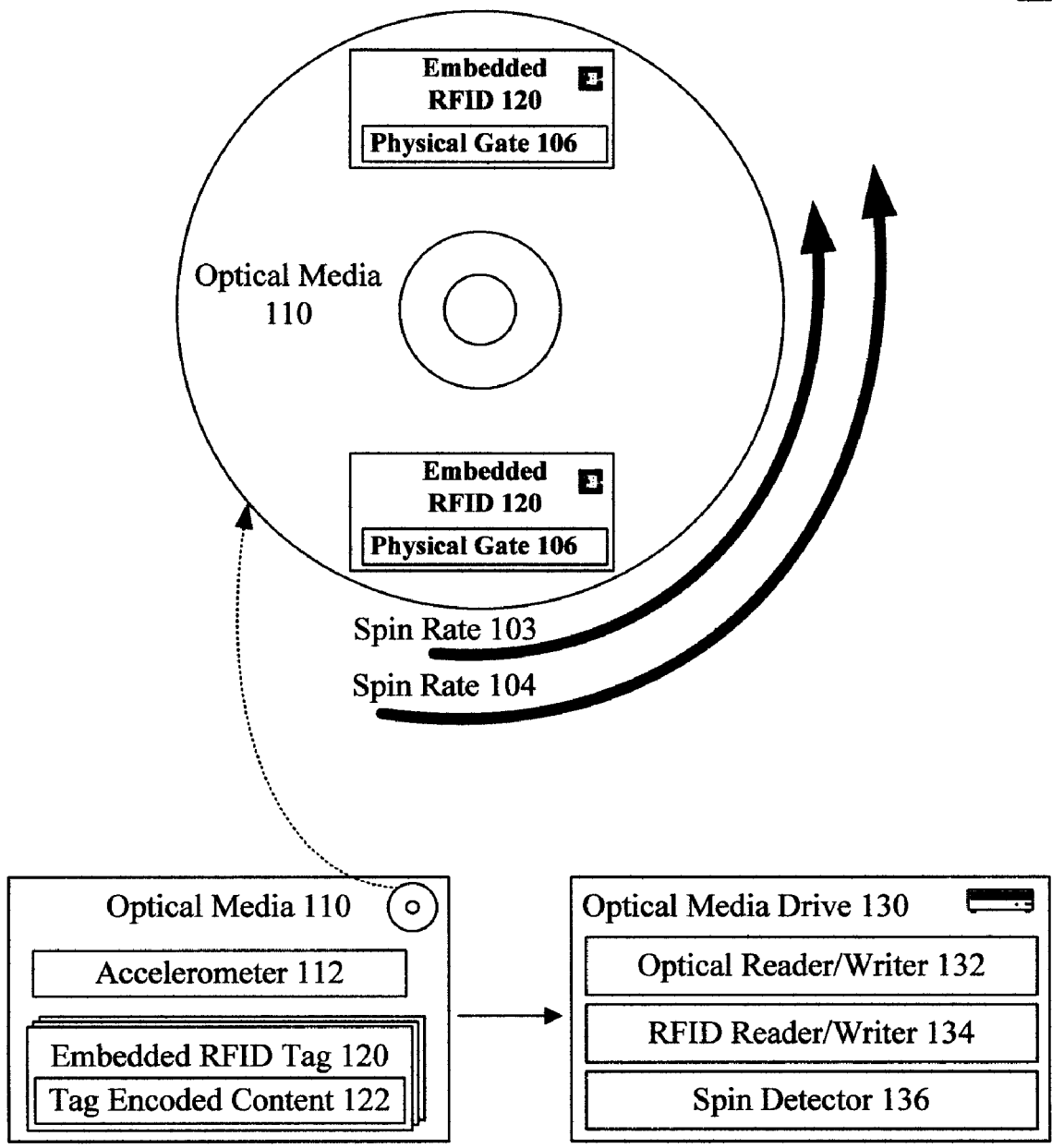
FIG. 1 is a schematic diagram of a system for using spin rate to protect digitally encoded content stored in a radio frequency identification (RFID) tag embedded in an optical media in accordance with an embodiment of the inventive arrangements disclosed herein.

FIG. 1 is a schematic diagram of a system 100 for using spin rate 103, 104 to protect digitally encoded content stored in a radio frequency identification (RFID) tag 120 embedded in an optical media in accordance with an embodiment of the inventive arrangements disclosed herein. The optical media 110 can include optically encoded content and one or more embedded RFID tag 120, which can contain RFID encoded content 122. The RFID tag 120 can include read-only storage sections and/or writeable storage sections. Different sections of the tag encoded content 122 can be associated with different spin rates 103, 104. Further, different tags 120 embedded in the media 110 can be protected by different spin rates 103, 104. A common spin rate 103, 104 can protect all tag 120 content or different spin rates 103, 104 can apply to different tags 120 or tag 120 sections.

A spin rate 103, 104 can refer to a rotational velocity or a rotational acceleration of the optical media 110. Spin rate 103, 104 can be measured using an accelerometer 112 or velocity detector embedded within the optical media 110 and/or using a spin detector 136 of an optical media drive 130 designed for accessing content stored in the optical media 110.

The spin-rate protected content 122 can be used for a variety of data processing purposes. For example, security information in the RFID encoded content 122 can be required to fully access the optically encoded content 112. Use of an embedded RFID tag 120 to protect the optically encoded content 112 can result in inherent security benefits. For example, removal/replacement of an embedded RFID tag 120 would likely damage the optically encoded content 112, rendering it unusable.

In another example, the tag encoded content 122 can be used for purposes unrelated to securing optically encoded content. For instance, data specific to optically encoded content 112 can be saved directly to the media 110 and automatically used regardless of which drive 130 or computer the media 110 is inserted into. For example, high scores, game state data (e.g., character level, items carried, game location, etc.), and the like can be stored in the media 110 versus storing user specific information in a stationary player. A writeable portion of the tag encoded content 122 can store bookmarks, documents, user files, preferences, state information, and other data. Different spin rates 103, 104 or ranges for accessing the content can be stored in the optical media 110, a readable portion of the RFID tag 120, the media drive 130, and any other information store. The spin rates 103, 104 can be optionally encrypted. Further, when media 110 is part of a set of media disks, the spin rates 103, 104 for one or more tags 120 can be located on one or more of the disks in the set. Thus, a spin rate 103, 104 for accessing content 122 may be optionally stored on a disk other than media 110.

Spin rate 103, 104 can be a fixed and/or a variable value. A fixed value spin rate 103, 104 can be a value offered by the optical media 110 content and/or an unlocked area of the RFID tag 120. For example, a fixed spin rate 103, 104 can be established at 1000 Revolutions Per Minute (RPM), where the tag encoded content is protected at other spin rates and accessible at the 1000 RPM rate or for a range including 1000 RPM.

In a variable embodiment, an initial spin rate 103 can be optically read from the media 110 and/or an unlocked portion of the content 122. This initial rate can change, however, during use. The spin rate 103, 104 can even be based upon dynamic factors. For example, the spin rate 103, 104 to access content 122 can be derived from a current system time/date. For example, if the hour of day is even, the spin rate 103, 104 can be 1000 RPM and if odd it can be 1500 RPM.

The spin rate 103, 104 can also change using a value from an unlocked RFID section, where the unlocking occurs based upon an initial spin rate 103, 104. Over time, optical media 110 content and/or hardware (e.g., drive 130) can update the RFID spin value stored in protected content 122. For example, two tags 120 can be included in an optical media 110. Tag A can be associated with a spin rate 103 of 1000 RPM. Tag B can be associated with a spin rate 104 of 1500 RPM. A program, such as one optically encoded in media 110, can request that both Tag A and Tag B have a spin rate 103, 104 of 1200 RPM. In a different instance, a program can cause Tag A and Tag B to swap spin rates, so Tag A is associated with a spin rate 103 of 1500 RPM and Tag B is associated with a spin rate 104 of 1000 RPM. In still another example, a spin rate 104 Tag B can be stored in a spin-protected area (122) of Tag A. When tags 120 are read/writable, spin values can change over time.

For instance, if a customer purchases two identical software titles from a store, these titles can either initially require different spin rates 103, 104 from each other or can evolve as used to require different spin rates 103, 104. The different spin rates 103, 104 can be based upon serial numbers, time of day, progress in a game, usage count, etc. Additionally, because content of media 110 can establish a correct spin rate 103, 104 and RFID tag 120 configuration, two identical software titles can contain different numbers of RFID tags 120, accelerometers 112, security schemes, spin rate values 103, 104, and the like. Regardless of what spin rate based and/or tag 120 dependent security measures are implemented, incorrect attempts at accessing secure content can trigger an error condition. These error conditions themselves can dynamically change the spin rate 103, 104 values, which make detecting a secure scheme for media 110 more difficult.

Numerous security technologies can be implemented to protect the tag encoded content 122, which include software and/or hardware security technologies. In one implementation, the tag encoded content 122 can be protected by a physical gate 106, which opens or closes depending upon the spin rate 103, 104. When the physical gate 106 is closed, access can be physically denied to the tag encoded content 122. When the physical gate 106 is open, access can be granted to the tag encoded content 122. Event when gate 106 is open, keys and/or credentials (e.g., user id and password) may be required to read and/or write tag encoded content 122. The gate 106 can be opened or closed using hardware/firmware/software locks. A hardware lock can be linked to an in-disk the accelerometer 112. A firmware lock can depend upon integrated circuitry embedded within the optical media. This circuitry can be powered by power source (e.g., a battery or capacitor) embedded in the optical media. The circuitry can also be powered by an optical drive component, such as by a RFID scanning component used to read a passive or semi-active RFID tag 120. The circuitry can also be powered by the rotational velocity of the spinning media 110. A software lock can require a software key be provided to unlock the gate 106.

In one embodiment, the gate 106 can open/close when a desired spin rate 103, 104 is achieved. In another embodiment, the spin rate 103, 104 may be sustained for X amount of time before the gate 106 opens. Similarly, the gate 106 can remain open for a configurable period of time after the spin rate 103, 104 changes.

Non-gate 106 related physical security technologies can selectively enable/disable an RFID component 134 of the media drive 130 so that the drive 130 is unable to read the content 122 unless the media 110 is spun at a suitable spin rate 103, 104. In one configuration, software-hardware based security measures can cause the RFID component 134 of drive 130 to be locked unless a software key is read from the tag encoded content 122. Still another gateless security measure can encrypt the tag encoded content 122, which renders the content unreadable unless an appropriate decryption key is provided, which is only available when the spin rate 103, 104 of the media 110 matches a previously established value or range of values. In general, system 100 can implement any security technique to restrict access to the tag encoded content 122 so that it is only accessible when the media 110 is spun at a previously established spin rate 103, 104.

The spin rate 103, 104 for opening the gate 106 or otherwise accessing secure content 122 does not necessarily match a rate for application operation. For example, a particular video game encoded on media 110 can run at 1,000 RPM during setup, but may need to throttle up to 2,000 RPM to playback high definition content. In one scheme, for example, the spin rate 103, 104 for the gate 106 can be set to 1500 RPM. In this example, between setup and playback of high definition content, the 1500 RPM tag can be accessible. A code "U" can be temporarily written to the content 122 when throttling upwards and a code "D" can be written when throttling downwards. If an incorrect code letter is detected at an inappropriate time, an error condition can be triggered, which can occur if the original optical disk 110 was swapped with a different one, or if the drive 130 fails to conform to a security specification involving spin rates 103, 104 and tags encoded content 122.

Moreover, a time for throttling up and down can be timed. For example, on a particular drive 130, inserted media 110 can throttle up from 1000 RPM to 2000 RPM in four seconds and can throttle down from 2000 RPM to 1000 RPM in three seconds. The 1500 RPM tag 120 can be expected to be accessible at a predetermined time in both directions, which can vary depending on the direction. When a tag 120 is not accessible at a correct time, an error condition can be triggered. Establishing drives 130 to "special" specifications can be particularly advantageous on video game consoles, where drives 130 can be chosen to deliberately spin a disk in a manner different from other, generally available, drives.

In one embodiment, for example, when a predetermined number of errors, which can be any number 1 . . . N, is detected, some or all of the tag encoded content 112 or the optically encoded content of media 110 can be more permanently or semi-permanently locked or disabled. For example, code stored in the RFID tag 120 can prevent the tag encoded content 122 from being read. In one configuration, disabling codes on content 122 can be accessed by calling a service agent and/or contacting a media unlocking Web services, which can provide a code to re-enable disabled media 110. Re-enabling disabled media 110 can require product/user identification/verification actions. Disabling optical media 110 and/or RFID tag 120 can make brute force determinations of security settings difficult.

The optical media 110 can include any media capable of storing optically encoded information. The optical media 110 can be pressed media that includes optically encoded content when manufactured, or burned media that is manufactured in a blank state and optically encoded content is thereafter added to the media 110 or "burned" into the media. Writable media 110 can be write-once media or re-writable media. The optical media 110 can have any number of content containing layers. The optical media can include, but is not limited to, compact disks (CDs), digital video disks (DVDs), BLU-RAY disks, HD disks, and the like. One or more tags 120 and/or weights can be positioned to balance the optical media, so that's spin is not negatively affected by a presence of the tag 120. In one embodiment, tags 120 can be positioned near a center of media 110. The tag 120 itself can be of any shape, which includes a circular shape, which can be used to prevent spin biasing. The RFID tag 120 can be completed embedded within a substance of the media 110 and/or can have one or more surface protrusions. RFID tag 120 can be a passive, a semi-active, or an active component. RFID tag 120 may also include other circuitry and components (e.g., accelerometer 112, gate 106, etc.).

The optional accelerometer 112 embedded in the optical media 110 can be a measuring device for detecting and measuring vibrations, for measuring acceleration due to gravity (inclination), and/or for measuring spin. The accelerometer 112 can be a Microelectromechanical system (MEMS) device, such as a suspended cantilever beam or proof mass with deflection sensing components and circuitry. The accelerometer 112 can be a single axis, a dual axis, or a three axis model, where accurate spin rate 103, 104 measurements can be achieved through single axis models. Additional axis models can be implemented to reduce fraud, as devices that simulate drive 130 behavior will likely bias rotational forces along an axis other than the spin axis. Any of a variety of technologies can be used to implement the accelerometer 112 including, but not limited to, a MEMS accelerometer, a laser accelerometer, a shear mode accelerometer, an electromechanical servo accelerometer, a capacitive spring mass based accelerometer, and the like. Some of these technologies can require components difficult to directly embed within media 100; in which case, portions of the accelerometer 112 can be implemented external to the media 110, such as with spin detector 136.

The drive 130 can be any consumer electronic device or device peripheral able to selectively read optically encoded content and tag encoded content 122. In one embodiment, the device assembly/housing can be arranged to prevent RFID tags 120 from being artificially attached to an optical media. The RFID tags 120 can be clipped or formed so that external readers/writers (other than drive 130) are unable to read/write tag encoded content 122. The drive 130 can be a special purpose drive specifically designed for media 110 having an embedded tag 120 or can be a multi-purpose drive able to read/write information from optical media not including an embedded RFID tag 120. The drive 130 can include an optical reader 132, an RFID reader 134, and a spin detector 136. Each of the optical reader 132 and the RFID reader 134 can also include a writing capability.

The spin detector 136 can detect a spin rate 103, 104 of the optical media 110. For example, the spin detector 136 can determine whether a disk is spinning at a 10× rate or a 14× rate. When an accelerometer 112 is included in the optical media 110, the spin detector 136 measurements can be independent measurements compared against the accelerometer 112 measurements. Tiered security measures can also be implemented, where an accelerometer 112 controls one of the measures, such as the physical gate 106, and the spin detector 136 handles a different type of security measure, such as content 122 protection through encryption/decryption.

In one configuration, the drive 130 can automatically detect tag 120 positioning and quantity within the optical media 110, which can serve as an additional protection mechanism. Different tags 120 can be associated with different active spin rates 103, 104. To illustrate, two RFID tags 120 can be embedded in media 110; one on an inner edge and the other on the outer edge. A security scheme can be enacted so that only one of the tags is to be unlocked/readable at a time. The inner edge RFID tag can be unlocked only when the media 110 has a spin rate 103 between 8× and 10×. The outer RFID tag can be unlocked only when the media 110 has a spin rate 104 between 14× and 18×. A security scheme can require information contained in both RFID tags. This scheme can iteratively accelerate/decelerate the media 110 from spin rate 103 to spin rate 104, reading necessary serialized information from the embedded RFID tags 120, when the tags 120 are spun at appropriate rates 103, 104. If at any time, one of the tags 120 is supposed to be locked/unreadable is instead readable, the security scheme can secure all tag encoded content 122 and can terminate. The security scheme that requires one or more RFID tags 120 to be selectively locked can prevent a creation/use of fraudulent "unlocked media 110." "Unlocked media 110" as used in this context can refer to RFID tag containing optical media analogous to unlocked cards for satellite receivers, where the unlocked satellite cards fraudulently circumvented satellite security measures that enabled free access to for-pay channels.

Figure 2:
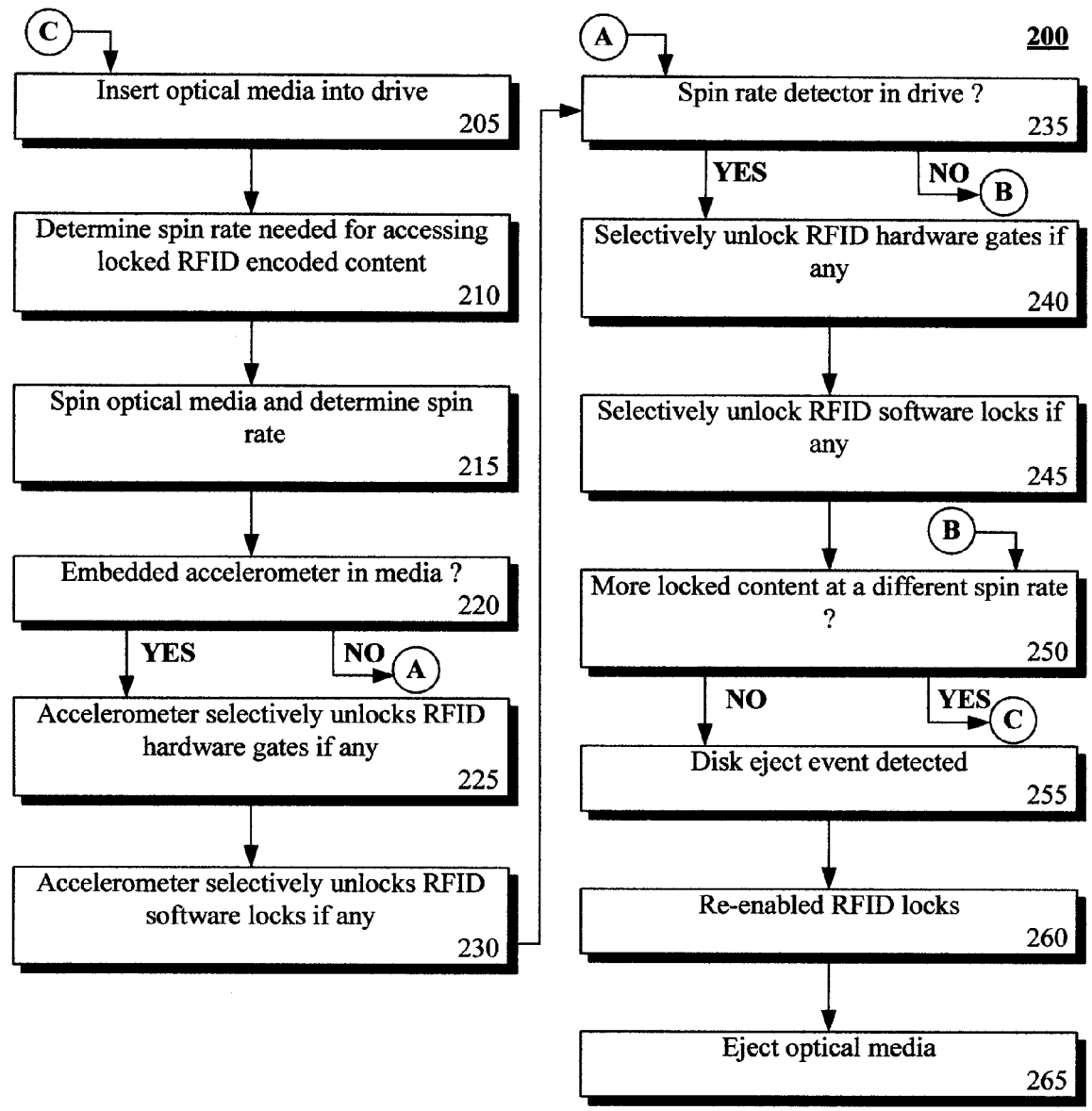
FIG. 2 is a flow chart of a method for protecting RFID encoded content stored in an RFID tag embedded within optical media based upon acceleration in accordance with an embodiment of the inventive arrangements disclosed herein.

FIG. 2 is a flow chart of a method 200 for protecting RFID encoded content stored in an RFID tag embedded within optical media based upon a media spin rate in accordance with an embodiment of the inventive arrangements disclosed herein. The method 200 can be performed in the context of system 100 or in the context of any optical media comprising an RFID tag.

The method 200 can begin in step 205, where optical media containing an RFID tag can be inserted into a drive. In step 210, a spin rate needed for accessing locked RFID encoded content can be determined. Information for a needed spin rate can be stored in an unprotected portion of the RFID tag, can be stored in an optically encoded portion of the optical media, can be stored in a memory of the drive itself, and/or can be stored in a memory space accessible by a processor performing programmatic actions to determine the spin rate in step 210.

In step 215, the optical drive can spin (accelerate) the optical media. The spin rate (either acceleration or rotational velocity) can be detected and used to selectively protect/unprotect RFID encoded content. For example, an accelerometer can be embedded in the optical media itself, which is checked for in step 220. When an accelerometer is found, the accelerometer read values can be used to selectively (i.e., when the determined acceleration values are within a previously established content unlock range) unlock protected content. For example, a hardware gate can protect RFID encoded content, which is unlocked in step 225 when appropriate acceleration values are detected. Software locks, such as software based encryption, can also be used to protect RFID content, which can be unlocked in step 230 when appropriate acceleration values are detected.

The method 200 can also use drive-specific hardware to detect a spin rate of the optical media for purposes of selectively accessing the RFID encoded information. Any drive-specific spin rate mechanisms can be used in a stand-alone embodiment where no accelerometer is contained within an optical disk. Drive specific spin rate mechanisms can also be used in conjunction with in-disk accelerometers to provide better overall security than using either spin-detection mechanism alone.

In step 235, a check for an optional spin rate detector of an optical drive can be performed. When no in-drive detector is included, the method can progress from step 235 to step 250. When a spin rate detector is found, the method can progress from step 235 to step 240, were depending upon a comparison between a media spin rate and an unlock rate/range, RFID hardware locks (e.g., physical gates in the media, or hardware locks on RFID reader in the drive) can be selectively unlocked. In step 245, software locks securing RFID encoded content can be selectively removed based upon detected the spin rate.

In the method, different segments of RFID encoded content can exist, which are associated with different unlock spin rates. The different segments of content can be stored in a common RFID tag or in different RFID tags embedded in the optical media. For this reason, a check for more tag encoded content associated with a different spin rate can be performed in step 250. When there is more locked content, the method can progress back to step 205, wherein instead of inserting the optical media again, the already inserted media can be adjusted to a different spin rate.

When no additional locked content is detected in step 250, the method can proceed to step 255, where a disk eject event can be detected. In some security schemes, before the disk is ejected, however, the RFID content locks, which include hardware and software locks, can be re-enabled, as shown in step 260. Once the locks are enabled, the optical media can be ejected in step 265.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than foregoing the specification, as indicating the scope of the invention.

What is claimed is:

1. A method for protecting RFID encoded content comprising:
   securing tag encoded content stored on one or more RFID tags embedded in an optical media, wherein the optical media comprises an accelerometer;
   determining a spin rate of the optical media, wherein said determined spin rate is determined by the accelerometer; and
   selectively unprotecting the tag encoded content on said one or more RFID tags when the detected spin rate satisfies a previously established spin condition, wherein the previously established spin condition is at least one a condition where the spin rate of the optical media is approximately equal to a previously established value and a condition where the spin rate of the optical media is within a previously established range of values.

2. The method of claim 1, further comprising:
   detecting a change in the spin rate, which results in the spin rate not satisfying the previously established spin condition; and
   responsive to the change, performing a tag content action on said one or more tags, said tag content action comprising at least one of protecting the tag encoded content and permanently disabling the tag encoded content.

3. The method of claim 1, wherein unprotected tag encoded content is content able to be read or written to by a RFID reader, and wherein protected tag encoded content is not able to be read or written to by a RFID reader.

4. The method of claim 1, wherein unprotected tag encoded content is content able to be copied to a data store external to the RFID tag, and wherein protected tag encoded content is not able to be copied to a data store external to the RFID tag.

5. The method of claim 1, wherein the tag encoded content comprises a security key, which is needed to access at least one of secured optically encoded content of one or more optical medias and tag encoded content on a physically separate tag.

6. The method of claim 1, wherein a plurality of distinct tag encoded content sections exist, wherein one of the tag encoded content sections includes said tag encoded content associated with said previously established spin condition, said method further comprising:

securing a different tag encoded content section based upon a different previously established spin condition from the spin condition of claim 1.

7. The method of claim 6, wherein said one tag encoded content section and said different tag encoded content section are stored within different RFID tags embedded in the optical media.

8. The method of claim 1, wherein the optical media comprises a physical gate which disables access to the RFID encoded content when the spin rate of the optical media does not satisfy the previously established spin condition, and which enables access to the RFID encoded content when the spin rate of the optical media satisfies the previously established spin condition.

9. The method of claim 1, wherein said steps of claim 1 are steps performed automatically by at least one machine in accordance with at least one computer program having a plurality of code sections that are executable by the at least one machine, said at least one computer program being stored in a machine readable medium.

10. An optical media comprising an RFID tag comprising:
protected RFID encoded content stored in the RFID tag, wherein a protection for the protected RFID encoded content is based upon a spin rate of the optical media, wherein the spin rate is based at least in part upon at least one of a rotational velocity of the optical media and a rotational acceleration of the optical media; and
a physical gate which disables access to the RFID encoded content when the spin rate of the optical media does not satisfy a previously established spin condition, and which enables access to the RFID encoded content when the spin rate of the optical media satisfies the previously established spin condition, wherein the previously established spin condition is at least one a condition where the spin rate of the optical media is approximately equal to a previously established value and a condition where the spin rate of the optical media is within a previously established range of values.

11. The optical media of claim 10, further comprising:
a second RFID tag comprising a second set of protected RFID encoded content stored in the second RFID tag, wherein a protection for the second set of protected RFID encoded content is based upon a second spin rate of the optical media, which is different from the spin rate protecting the RFID encoded content of claim 10.

12. The optical media of claim 11, wherein the protected RFID encoded content comprises a security key, which is needed to access secured optically encoded content of the optical media.

13. The optical media of claim 10, further comprising:
an accelerometer embedded in the optical media configured to detect the spin rate of the optical media, wherein said detected spin rate is used to determine whether the RFID encoded content is protected or is unprotected.

14. An optical media drive comprising:
an optical reader configured to read optically encoded content stored in optical media; and
a Radio Frequency Identification (RFID) reader configured to read tag encoded content stored in at least one RFID tag embedded in optical media, wherein at least a portion of the tag encoded content is protected based upon a spin rate of the optical media, wherein the spin rate is based upon at least one of a rotational velocity of the optical media and a rotational acceleration of the optical media;
a spin rate detector configured to determine a spin rate of the optical media in the optical drive; and
a media spin rate detector embedded within optical media inserted in the optical media drive, wherein the protected tag encoded content is only accessible when both the media spin rate detector and the spin rate detector of the optical media drive indicate that the optical media has a spin rate that favorably compares to a previously established spin rate for accessing the protected tag encoded content.

15. The optical media drive of claim 14, wherein the media spin rate detector is an accelerometer, and wherein the spin rate detector of the optical drive is a rotational velocity detector.

16. The optical media drive of claim 14, wherein the RFID reader is selectively disabled based upon the spin rate of the optical media.

* * * * *